(12) United States Patent
Mosko et al.

(10) Patent No.: US 11,625,228 B2
(45) Date of Patent: Apr. 11, 2023

(54) SYSTEM AND METHOD FOR FACILITATING EFFICIENT ROUND-TRIP ENGINEERING USING INTERMEDIATE REPRESENTATIONS

(71) Applicant: Palo Alto Research Center Incorporated, Palo Alto, CA (US)

(72) Inventors: Marc E. Mosko, Santa Cruz, CA (US); Eric A. Bier, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 205 days.

(21) Appl. No.: 17/039,085

(22) Filed: Sep. 30, 2020

(65) Prior Publication Data

US 2022/0100477 A1    Mar. 31, 2022

(51) Int. Cl.
| | | |
|---|---|---|
| *G06F 8/35* | (2018.01) | |
| *G06F 8/73* | (2018.01) | |
| *G06F 8/658* | (2018.01) | |
| *G06F 8/71* | (2018.01) | |

(52) U.S. Cl.
CPC .............. *G06F 8/355* (2013.01); *G06F 8/658* (2018.02); *G06F 8/71* (2013.01); *G06F 8/73* (2013.01)

(58) Field of Classification Search
CPC . G06F 8/355; G06F 8/658; G06F 8/71; G06F 8/73
See application file for complete search history.

(56) References Cited

U.S. PATENT DOCUMENTS

| | | | | |
|---|---|---|---|---|
| 8,234,105 B1 * | 7/2012 | Aldrich | ............... | G06F 11/3684 703/22 |
| 2007/0209031 A1 * | 9/2007 | Ortal | ......................... | G06F 8/36 717/104 |

OTHER PUBLICATIONS

László Angyal et al., "A Synchronizing Technique for Syntactic Model-Code Round-Trip Engineering," 2008 [retrieved on Jun. 16, 2022], 15th Annual IEEE International Conference and Workshop on the Engineering of Computer Based Systems, pp. 463-472, downloaded from <url>:https://ieeexplore.ieee.org. (Year: 2008).*

Michał Antkiewicz et al., "Round-trip engineering of eclipse plug-ins using eclipse workbench part interaction FSML," 2006 [retrieved on Jun. 16, 2022], Models 2006: Model Driven Engineering Languages and Systems, pp. 692-706, downloaded from <url>:https://link.springer.com. (Year: 2006).*

(Continued)

*Primary Examiner* — S. Sough
*Assistant Examiner* — Stephen D Berman
(74) *Attorney, Agent, or Firm* — Shun Yao; Yao Legal Services, Inc.

(57) ABSTRACT

Embodiments described herein provide a round-trip engineering system. During operation, the system can maintain an intermediate system representation (ISR) for a set of artifacts of a piece of software. The set of artifacts can include a piece of code and a development model. The ISR can remain persistent upon synchronization of the set of artifacts. The system can incorporate, in a respective component of the ISR, a reference to a code block in the piece of code and a corresponding element in the development model. If the system determines a first update in a first segment of a first artifact of the set of artifacts, the system can identify a second segment in a second artifact from the set of artifacts based on a corresponding component in the ISR. The system can then propagate a second update to the second segment to reflect the first update in the first segment.

22 Claims, 11 Drawing Sheets

(56) References Cited

OTHER PUBLICATIONS

Ali Razavi et al., "Incremental model synchronization in model driven development environments," 2009 [retrieved on Sep. 28, 2022], CASCON '09: Proceedings of the 2009 Conference of the Center for Advanced Studies on Collaborative Research, pp. 216-230, downloaded from <url>:https://dl.acm.org. (Year: 2009).*

Thomas Buchmann et al., "Using triple graph grammars to realise incremental round-trip engineering," 2016 [retrieved on Jan. 12, 2023], IET Softw., 2016, vol. 10, Iss. 6, pp. 173-181, downloaded from <url>:ietresearch.onlinelibrary.wiley.com. (Year: 2016).*

* cited by examiner

SYSTEM AND METHOD FOR FACILITATING EFFICIENT ROUND-TRIP ENGINEERING USING INTERMEDIATE REPRESENTATIONS

BACKGROUND

Field

This disclosure is generally related to the field of software development (e.g., software engineering). More specifically, this disclosure is related to a system and method for facilitating efficient and interactive round-trip engineering using intermediate representations.

Related Art

A software development environment may maintain synchronization between two or more related software artifacts, such as source code and development models (e.g., a Unified Modeling Language (UML) model). This allows the software development environment to promptly update an artifact if a software developer modifies another artifact, thereby restoring the synchronized states between the related artifacts. The process of updating artifacts to reflect changes in a related artifact can be referred to as round-trip engineering (RTE).

RTE allows the software developer to choose between updating the source code or the model since an underlying RTE tool may propagate the updates to the other artifact. Thus, the software developer can choose to modify the artifact that may streamline the task. However, since the source code can be in a textual format while the model can be represented as a diagram or in a markup language, individual elements in these artifacts may not have an explicit association between them. Consequently, the propagation of the updates between artifacts can be error-prone and computationally intensive. Furthermore, traditional RTE tools are ill-equipped to facilitate RTE if multiple software developers collaborate in real-time on a project.

While RTE brings many desirable features to a software development environment, some issues remain unsolved in facilitating efficient and interactive RTE between artifacts.

SUMMARY

Embodiments described herein provide a round-trip engineering system in a development environment. During operation, the system can maintain an intermediate system representation (ISR) for a set of artifacts associated with a piece of software. The set of artifacts can include a piece of code and a development model. The ISR can remain persistent upon synchronization of the piece of code and the development model. The system can incorporate, in a respective component of the ISR, a reference to a code block in the piece of code and a corresponding model element in the development model. The component may represent the code block and the model element in the ISR. If the system determines a first update in a first segment of a first artifact of the set of artifacts, the system can identify a second segment in a second artifact from the set of artifacts based on a corresponding component in the ISR. The system can then propagate a second update to the second segment to reflect the first update in the first segment.

In a variation on this embodiment, the system can determine a set of operations on the ISR based on the first update in the first segment.

In a further variation, the system can determine the set of operations on the ISR based on one or more of: looking up the first update in a direct mapping between the first update and the set of operations, and traversing a decision tree associated with the ISR and the first update.

In a further variation, the system can propagate the second update by determining operations of the second update based on one or more of: the first update in the first segment and the set of operations on the ISR.

In a variation on this embodiment, the system can augment a respective component of the ISR with metadata associated with the set of artifacts. The metadata can include one or more of: developer information of the first segment, developer information of the second segment, formatting, syntax, comments, and non-code content.

In a further variation, the ISR can be represented as an augmented abstract syntax tree (AAST). A respective component of the ISR can then be a tree node of the AAST that has been augmented with the metadata.

In a further variation, the system can determine a plurality of developers contributing to different segments of an artifact based on the metadata. The system can then lock a respective segment of the ISR associated with an individual segment of the artifact on behalf of the corresponding developer.

In a variation on this embodiment, the system can determine changes to a first segment of the ISR based on changes from a plurality of developers to the first artifact. The system can then merge the changes to the first segment to generate a second segment of the ISR that replaces the first segment and is consistent with the changes. Subsequently, the system can update the second artifact to be consistent with the second segment;

In a variation on this embodiment, the system can determine whether the second update can be generated automatically. If the second update can be generated automatically, the system can generate operations of the second update and apply the generated operations on the second segment. On the other hand, if the second update cannot be generated automatically, the system can annotate the second segment for updating.

In a variation on this embodiment, the system can determine the execution of a code block in the piece of code. The system can then annotate a model element in the development model. The code block and the model element can be associated with the same component in the ISR.

In a variation on this embodiment, the system can store a file representing the ISR in a local storage device without storing files representing the set of artifacts. In response to a request for accessing an artifact, the system can generate a file representing the artifact from the ISR.

BRIEF DESCRIPTION OF THE FIGURES

In the figures, like reference numerals refer to the same figure elements.

DETAILED DESCRIPTION

Figure 1:
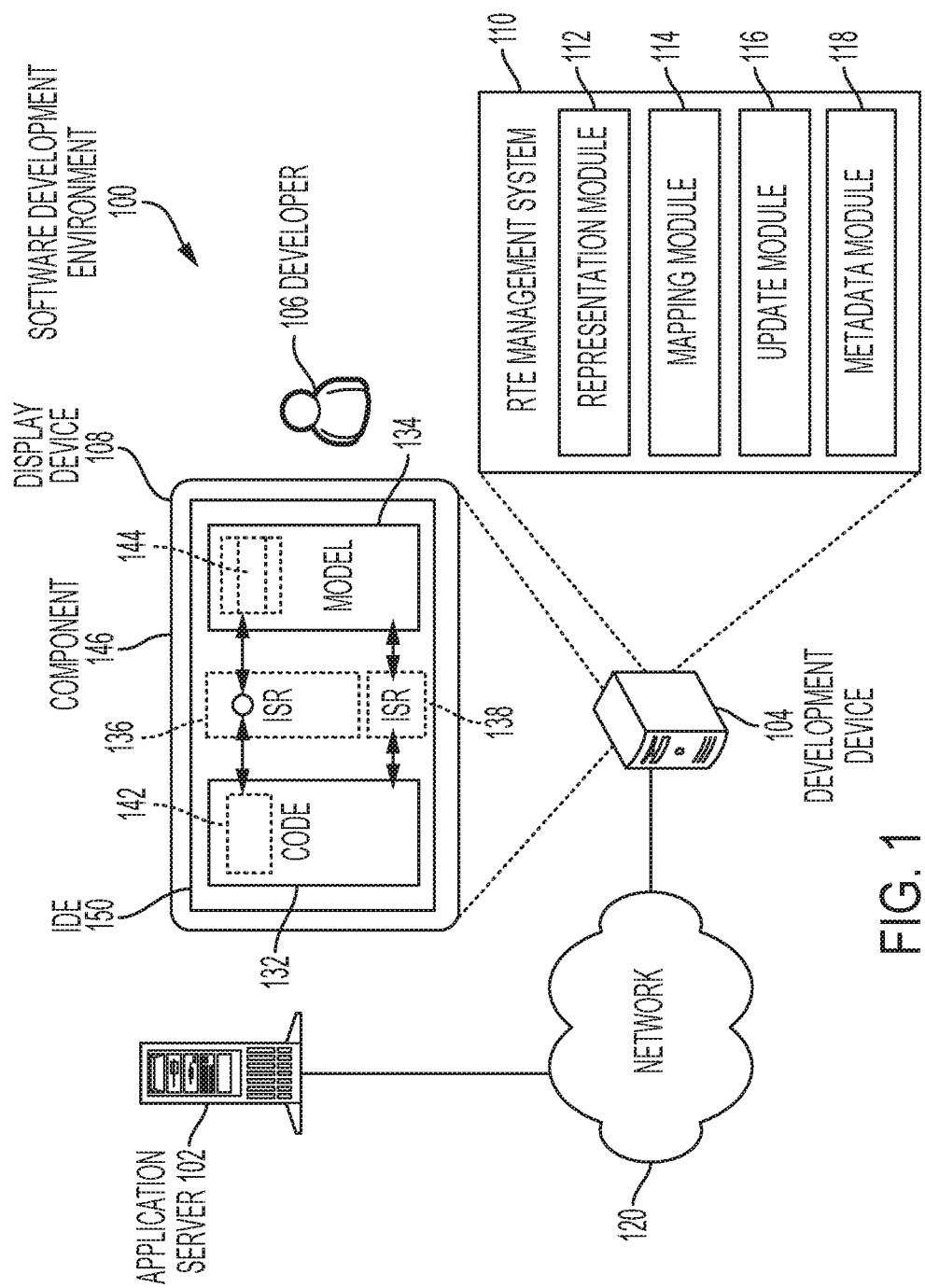
FIG. 1 illustrates an exemplary software development environment facilitating efficient RTE based on an intermediate system representation (ISR), in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of efficiently facilitating RTE in a software development environment by (i) generating a persistent ISR that represents a plurality of software artifacts, thereby establishing association among corresponding elements of the software artifacts, and (ii) synchronizing between the software artifacts in real time based on the ISR. In this way, whenever a software developer updates an element in one artifact, the ISR can be used to locate and update the corresponding element in another artifact.

With existing technologies, the RTE tool may be incapable of establishing association (or linkage) between related elements in software artifacts, such as a code block in the source code and a corresponding element in a development model (or a system model). In particular, since the respective representations of the code and the model can be different, the RTE tool may not be able to locate related elements in the artifacts efficiently. As a result, if one artifact is updated, the RTE tool may have to execute error-prone and computationally intensive operations to update another artifact. In addition, the RTE tool may need to support the developer in working with both auto-generated codes and manually-generated codes. In particular, if a developer edits the auto-generated codes, the corresponding updates may not be reflected in the system model.

In a multi-developer collaborative environment, multiple developers may work, often in parallel, on the code. Consequently, in addition to determining the association between the code and development model, the RTE tool may need to identify and track the developer editing a particular code block or an element in the model. Moreover, when a code block is executed (e.g., based on interpretation or compilation), a corresponding element of the model may become active. However, even though the code may execute in order, the model may not represent the same order. As a result, the RTE tool may also be incapable of determining which element of the model may become active when a corresponding code block is executed.

To solve this problem, an RTE management system can use an intermediate system representation (ISR) to maintain an association between the artifacts. Whenever a new element in an artifact is created, the system can generate a corresponding element in another artifact. The system can then generate a component in the ISR and associate both components to the element. The ISR and a respective component of the ISR can be based on one or more data structures. Examples of an ISR can include, but are not limited to, an abstract syntax tree (AST), an intermediate language-based representation, and reverse mapping rules. If the ISR is an AST, a component in the ISR can be a tree node. The system can then create a node in the AST whenever a new code block and a new element in a model is created. The node can maintain a pointer to the code block and the model component, thereby facilitating an association between the artifacts.

Unlike current technologies, the ISR can be a persistent representation stored in conjunction with the artifacts. Even when the artifacts are synchronized, the ISR can remain persistent. A component in the ISR can be mapped to both a piece of code (e.g., a code block) and a corresponding element in the model. For example, the component can include respective pointers to the code block and the model element to facilitate the mapping. Hence, the system can determine the association between the code block and the model element using the ISR. Therefore, if one artifact is updated, the system can efficiently identify the corresponding element of the other artifact, and help the developer to propagate the updates to the other artifact efficiently. Furthermore, the system may, when feasible, automatically propagate the updates (or a subset of the updates) to the other artifact.

Similarly, since a respective component in the ISR can be mapped to a corresponding code block, when the code block is executed, the system can, in real-time, identify the corresponding component in the ISR. The system can determine the model element mapped to the identified component. Consequently, when the code block is executed, the system can identify the model component. This allows a development environment, such as an integrated development environment (IDE), included with the system to highlight the corresponding element of the model in real-time. In some embodiments, a respective component of the ISR can maintain associated metadata, such as information associated with the developer who has added each code block and/or the corresponding model component. Based on this information, the system can maintain the integrity and correspondence between artifacts in a collaborative development environment.

A method (or function) defined in the code can correspond to one or more components in the ISR (e.g., one or more nodes in an AST). For object-oriented programming (OOP), the method can be defined within the context of a class. For procedural programming, the method can be defined in a generic way. A respective component associated with the method can include references to one or more source code lines. As a result, the code block corresponding to a component in the ISR can be at a granularity of an individual line of code. This allows the ISR to facilitate fine-grained representation within the code representing a method. The components associated with individual lines of code can also include a reference to a corresponding element in the model, such as Extensible Markup Language (XML) paths or a method signature of the code that includes the lines of code.

In some embodiments, the system can build and maintain an ISR for one or more target languages. For example, the code of a piece of software can be in Javascript/Node.JS for the frontend of the software and Java for the backend. Accordingly, the system can maintain an ISR that can represent the codes written in these languages. Similarly, if part of the code is in Visual Basic or C#, codes developed in each of these languages can be represented by a corresponding ISR. If two languages are compatible with each other (e.g., have a common intermediate form), the system can use a shared ISR for these languages. Therefore, the ISR can include multiple ISR segments. For example, if an AST represents the ISR, the AST can include a set of disconnected sub-trees. On the other hand, a single development model may represent the piece of software. Hence, updates in a single model can induce updates across multiple ISR segments. To facilitate the propagation of updates between the artifacts, each ISR segment may maintain a mapping between the model and the corresponding code.

Exemplary System

FIG. 1 illustrates an exemplary software development environment facilitating efficient RTE based on an ISR, in accordance with an embodiment of the present application. An RTE tool in a software development environment 100 may facilitate RTE for a development device 104, which can be coupled to a network 120, which can be a local or a wide area network. A developer 106 may develop a piece of software (e.g., an application) using development device 104 using display device 108. Developer 106 can use an IDE 150 supported in environment 100. For example, if environment 100 supports Java, IDE 150 can be Eclipse. The piece of software may run on an application server 102. Upon development, development device 104 can provide the piece of software to application server 102 via network 100. The piece of software can be developed based on a set of software artifacts, such as source code 132 and development model 134 (or system model 134).

With existing technologies, an RTE tool may be incapable of establishing association (or linkage) between related parts in the artifacts, such as a code block 142 (e.g., a method) in code 132 and a corresponding element 144 (e.g., a signature of the method), in model 134. In particular, code 132 can be in a textual form, and model 134 can be represented in a diagram or markup language, the RTE tool may not be able to locate corresponding elements in code 132 and model 134 efficiently. As a result, if one of code 132 or model 134 is updated, the RTE tool may have to execute error-prone and computationally intensive operations to update the other one. In addition, the RTE tool may need to support the developer in working with both auto-generated codes and manually-generated codes in code 132. For example, if developer 106 edits the auto-generated segments of code 132, the corresponding updates may not be reflected in model 134.

To solve this problem, environment 100 can include an RTE management system 110 that can use an ISR 136 to maintain an association between the artifacts, which are code 132 and model 134. System 110 can include a representation module 112, a mapping module 114, an update module 116, and a metadata module 118. During operation, if developer 106 generates code block 142 in code 132, update module 116 may generate element 144 in model 134 in conjunction with IDE 150. Similarly, if developer 106 generates element 144 in model 134, update module 116 may generate code block 142 in code 132. In either instance, representation module 112 can generate a component 146 in ISR 136 and include references (or pointers) to both code block 142 and element 144 in component 146. ISR 136 and component 146 can be based on one or more data structures. Examples of ISR 136 can include, but are not limited to, an AST, an intermediate language, and reverse mapping rules.

In some embodiments, ISR 136 can be based on an AST. Component 146 can then be a node in the AST. Representation module 112 can then create a node in the AST when code block 142 and element 144 are generated. The node can maintain respective references (or pointers) to code block 142 and element 144, thereby facilitating an association between the parts in the artifacts. For example, if the node is represented based on an object (or a structure) defined in a language, the object can include references to code block 142 and element 144. Mapping module 114 can include references to code block 142 and element 144 in component 146.

Unlike current technologies, ISR 136 can be a persistent representation stored in conjunction with code 132 and model 134. Therefore, even when code 132 and model 134 are synchronized, representation module 112 can still maintain ISR 136, thereby ensuring persistence for ISR 136. Representation module 112 may maintain a copy of ISR 136, as well as code 132 and model 134, in a persistent storage device (e.g., a non-volatile memory device) of device 104 to ensure if device 104 is rebooted, each of them are saved and stored. Since component 146 can include references to both code block 142 and element 144, mapping module 114 can facilitate a bidirectional mapping between code block 142 and element 144 based on component 146. Consequently, if either code block 142 or element 144 is updated, update module 116 can efficiently identify the other element based on component 146. In this way, system 110 can help the developer to propagate the updates to the other element efficiently. Furthermore, update module 116 may, when feasible, automatically propagate the updates (or a subset of it) to the other artifact.

In addition, since component 146 can be mapped to code block 142, when code block 142 is executed, mapping module 114 can, in real-time, identify the corresponding component 146 in ISR 136. Mapping module 114 can then determine that element 144 mapped to component 146. Consequently, when code block 142 is executed, mapping module 114 can identify element 144. This can allow IDE 150, based on system 110, to highlight the corresponding element 144 in model 134 in real-time. In some embodiments, metadata module 118 can include metadata information associated with code block 142 and element 144 in component 146. For example, metadata information can include information associated with developer 106, who has added each code block 142 and/or element 144. If environment 100 is a collaborative development environment where multiple developers collaborate on code 132 and/or model 134, system 110 can maintain the integrity and correspondence between code 132 and element 134 based on the metadata information.

In some embodiments, system 110 can build and maintain an ISR for one or more target languages. For example, if code 132 is in Javascript/Node.JS for the frontend of the software and Java for the backend, system 110 can maintain ISR 136 such that it can represent codes written in these languages. Similarly, if part of code 132 is in Visual Basic or C#, codes developed in each of these languages can be represented by a corresponding ISR 138. If two languages are compatible with each other (e.g., have a common intermediate form), ISR 138 can be shared for these languages. Therefore, system 110 can maintain multiple ISRs 136 and 138. On the other hand, a single model 134 may represent the piece of software. Hence, updates in model 134 can induce updates across ISRs 136 and 138. To facilitate the propagation of updates between code 132 and model 134, each of ISRs 136 and 138 may maintain a mapping between model 134 and corresponding code 132.

In this way, system 110 can facilitate efficient and interactive RTE in environment 100 using ISRs 136 and 138. When developer 106 creates and edits code 132 or model 134, system 110 can help to display the correspondences between code 132 and model 134, thereby allowing developer 106 to identify and correct any inconsistencies. Furthermore, system 110 may suggest refactoring operations on code 132 and model 134. In addition, system 110 may suggest manual edits that are needed in code 132 or model 134, if necessary. System 110 can also enhance a debugging tool in environment 100 by highlighting the segments of code 132 and model 134 during the execution of code 132. Moreover, when code 132 is in multiple programming languages, as described above, system 110 can propagate an update in model 134 to code 132.

Intermediate System Representation

Figure 2A:
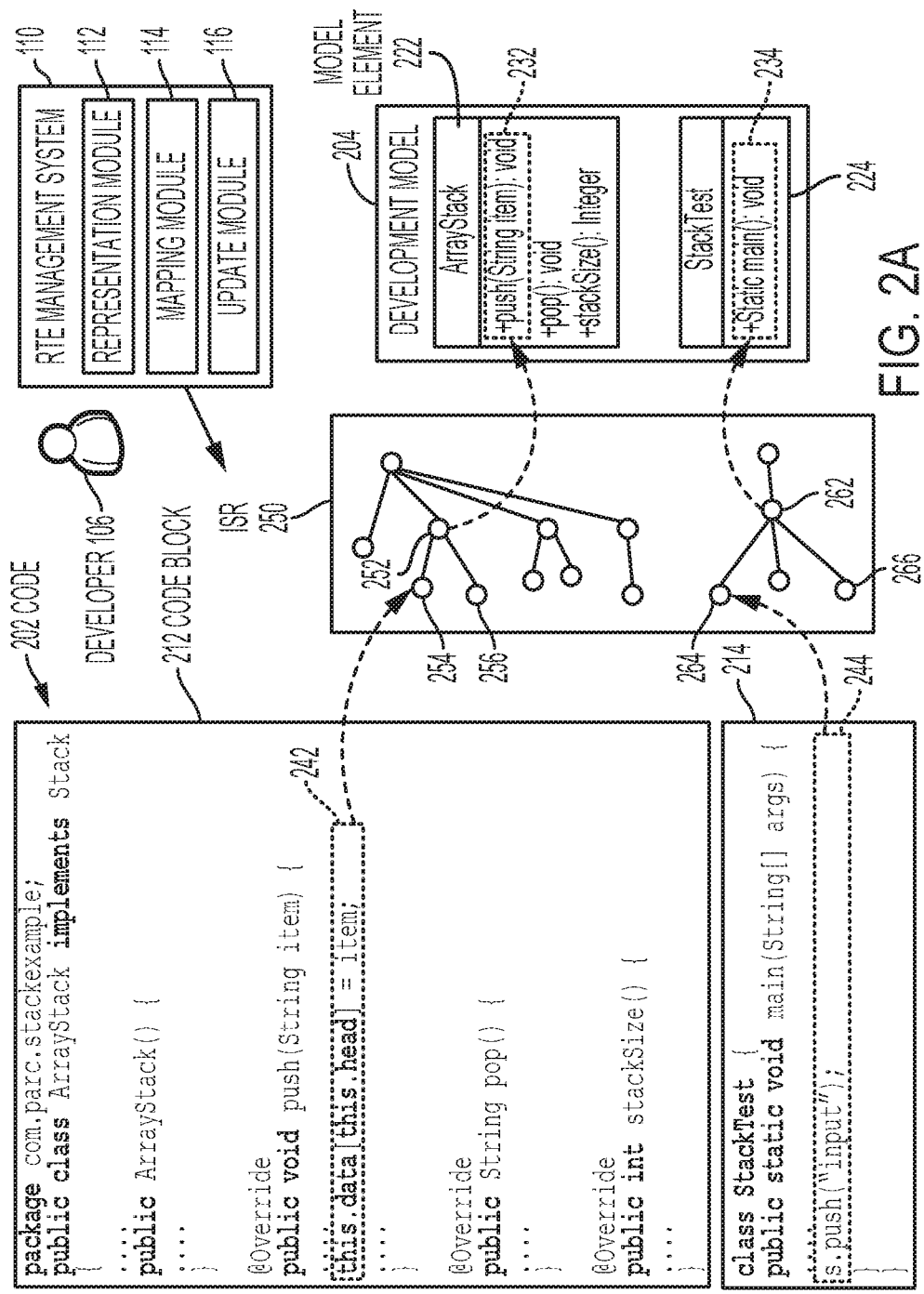
FIG. 2A illustrates exemplary efficient RTE on updates generated from the source code of a piece of software based on an ISR, in accordance with an embodiment of the present application.

FIG. 2A illustrates exemplary efficient RTE on updates generated from the source code of a piece of software based on an ISR, in accordance with an embodiment of the present application. A piece of code 202 can include code blocks 212 and 214. A corresponding development model 204 can include model elements 222 and 224. In this example, code block 212 can represent a class (e.g., a class named "ArrayStack," which implements a stack of String objects), and element 222 can represent a class diagram corresponding to the ArrayStack class. Similarly, code block 214 can represent another class (e.g., the main class named "StackTest," which uses an ArrayStack to reverse a list of Strings), and element 224 can represent a class diagram corresponding to the StackTest class. Representation module 112 can generate an ISR 250 (e.g., an AST) associated with both code 202 and model 204.

A method defined in code block 212 can correspond to one or more components in ISR 250 (e.g., one or more nodes in the AST). For example, a "push" method in code block 212 can be represented by component 252, which can also represent method signature 232 of the push method in element 222 of model 204. In other words, component 252 can maintain references to the push method in code block 212 and corresponding method signature 232. Similarly, the "main" method in code block 214 can be represented by component 262, which can also represent method signature 234 of the "main" method in element 224 of model 204.

ISR 250 can further include components 254 and 256 that can represent code lines within the push method. Similarly, ISR 250 can include components 264 and 266 that can represent code lines within the main method. For example, components 254 and 264 can represent code line 242 in code block 212 and code line 244 in code block 214, respectively (denoted with dotted lines). Therefore, a component in ISR 250 can facilitate the representation at a granularity of an individual line of code. This allows ISR 250 to facilitate fine-grained representation within code block 212. Since components 254 and 256 are part of the push method, ISR 250 can maintain an association (e.g., a parent-child or an "is a part of" relationship) between these components and component 252 representing the push method. If ISR 250 is an AST, component 252 can be a parent node of components 254 and 256, and component 262 can be a parent node of components 264 and 266.

However, since model 204 may not represent individual code lines, components 254 and 256 may not have a direct reference to model 204. Nonetheless, component 252 may include a reference to corresponding method signature 232 in model 204. Hence, to identify the corresponding element in model 204 for component 254 (or 256), mapping module 114 may traverse ISR 250 from component 254 and determine that component 254 is related to "parent" component 252. Based on the determination, mapping module 114 can obtain the reference to signature 232 in model 204. In the same way, by traversing from component 264, mapping module 114 can identify parent component 262 and obtain the reference to signature 234 in model 204.

System 110 can persistently store ISR 250 in addition to using ISR 250 as an intermediate step in producing code 202 from model 204 and model 204 from code 202. As a result, if developer 106 single-steps through code 202 to identify a bug or to understand the function of code 202, system 110 can use ISR 250 to identify the corresponding element in model 204. The explicit representation of the associations between code 202 and model 204 in ISR 250 to highlight corresponding artifacts when one of them is being updated or traversed.

For example, if developer 106 modifies model 204, the modification may require manual changes to code 202. Under such circumstances, system 110 can display an annotation in model 204, indicating that a change in code 202 is pending. Once developer 106 changes code 202 to correspond to the changes in model 204, system 110 may clear the annotation. It should be noted that if partial changes in code 202 reflect the critical changes in model 204, system 110 may clear the annotation. Examples of changes in code 202 can include, but are not limited to, renaming a namespace, renaming a class, renaming a method, renaming or redefining a variable, redefining a namespace, and adding or removing a class.

Each such change in code 202 may trigger a corresponding change in ISR 250. Each component in ISR 250 (e.g., each node type in the AST) can have a set of operations that can be performed on it. Each of the operations can correspond to a set of effects on ISR 250. In some embodiments, the set of effects can be pre-defined. System 110 can maintain a direct operation mapping between an update operation in an artifact and a set of operations to be performed on ISR 250. The mapping can allow system 110 to look up the set of operations using the update operation in the artifact. System 110 may maintain a decision tree associated with the update operation. Based on the current state of the artifact and the type of the update, the system can traverse the decision tree to determine the set of operations on ISR 250.

For example, if ISR 250 is an AST, the effects can include pruning a sub-tree, renaming a tree node, moving a sub-tree, and changing the attachment of an edge. When developer 106 changes code 202, update module 116 can determine the changes performed on code 202 and identify the ordering of the changes. Representation module 112 can then apply the corresponding changes on ISR 250. System 110 can determine the changes in ISR 250 based on the direct mapping or the traversal of the decision tree. If developer 106 has used an IDE that supports system 110, update module 116 may identify the changes and perform the corresponding actions on ISR 250. For example, the IDE can have the ability to record the changes (e.g., the lines of code that were added, deleted or modified in code 202) that developer 106 has made and the order in which the changes are made. Based on the recorded information, system 110 can detect the respective types of changes, and synchronize code 202 and model 204 to reflect the changes.

Update module 116 may also identify changes performed outside of an IDE. For example, update module 116 can detect the differences in two versions of code 202 based on a version control system. Such differences can include adding, deleting, or moving a piece of code in code 202. Upon detecting the changes, representation module 112 can propagate the corresponding changes to ISR 250. If the changes in ISR 250 are triggered by changes in code 202, mapping module 114 may help developer 106 discover additional changes needed in code 202 to facilitate consistency within code 202. For example, if developer 106 changes the name of a method in code block 242 but does not change the reference to the method in code block 244, mapping module 114 may identify the disparity from ISR 250. Accordingly, system 110 can warn developer 106 of the need for a refactoring operation in code 202 to update the references. Similarly, system 110, in conjunction with an IDE, can determine any changes in model 204. System 110 may automatically generate further changes to model 204 to ensure consistency. If automatic generation is not possible, system 110 can notify developer 106 of the changes that are needed.

Figure 2B:
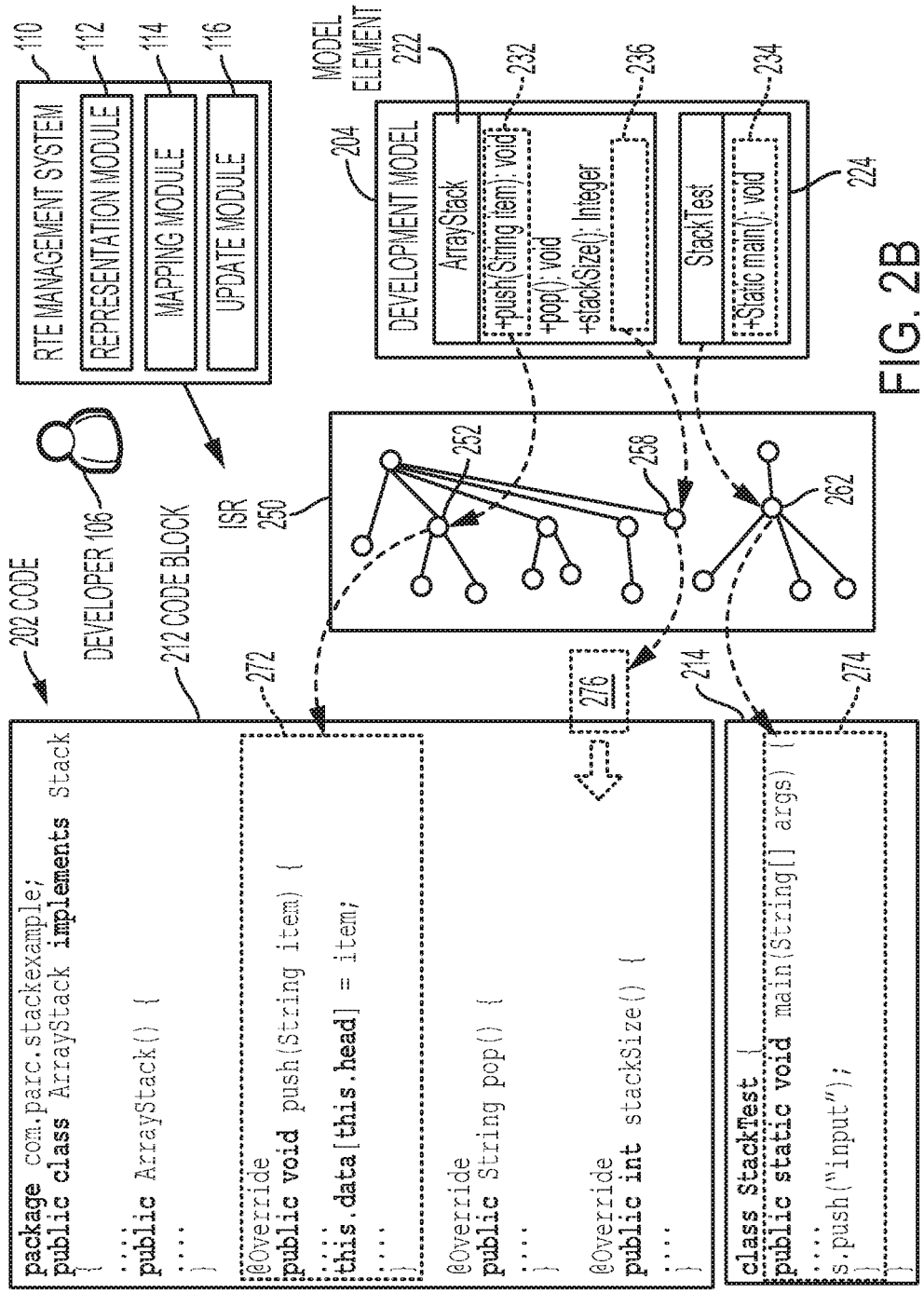
FIG. 2B illustrates exemplary efficient RTE on updates generated from the development model of a piece of software based on an ISR, in accordance with an embodiment of the present application.

FIG. 2B illustrates exemplary efficient RTE on updates generated from the development model of a piece of software based on an ISR, in accordance with an embodiment of the present application. Since model 204 can have less detail than code 202, some updates can be confined in code 202 and may not have a corresponding update in model 204. In particular, model 204 can be intentionally underspecified to improve the higher-level reasoning of model 204 compared to the details of code 202. If developer 106 updates model 204, update module 116 may indicate, to developer 106, which corresponding code blocks need to be changed in code 202. In particular, the communication to developer 106 may include one or more of: automatically adding comments in code 202, adding annotations that appear next to code 202 in the IDE, automatically producing a list of tasks in a task tracking system, and displaying the needed changes in dialog box or window.

In this example, if developer 106 modifies method signature 232, mapping module 114 can identify corresponding component 252 in ISR 250. Component 252 can further be associated with the push method in code block 212. Therefore, system 110 can highlight a piece of code 272, which can encompass the push method, in code block 212. However, since method signature 232 may not include further details regarding the content of piece of code 272, system 110 may highlight, in conjunction with an IDE, piece of code 272 in its entirety. Similarly, if developer 106 modifies method signature 234, mapping module 114 can identify a corresponding piece of code 274 in code block 214 based on corresponding component 262 in ISR 250. System 110 can then highlight piece of code 274 in its entirety.

In some embodiments, update module 116 may automatically propagate some updates in model 204 to code 202. If developer 106 switches a class to a base class, or adds or removes a method, update module 116 can propagate some basis changes to code 202 without detailed implementation. For example, if developer 106 adds another method signature 236 in element 222, mapping module 114 can generate a corresponding component 258 in ISR 250. Update module 116 can then generate a basic piece of code 276 corresponding to method signature 236 in code block 212. When more details are added to piece of code 276, mapping module 114 can generate corresponding fine-grained components in association with component 258 in ISR 250.

If developer 106 makes a change to model 204, system 110 can update ISR 250 to reflect the change. Modifying ISR 250 based on a change in model 204 may affect fewer types of components in ISR 250 compared to a change in code 202. As with updating code 202, system 110 can facilitate operations that update model 204 for the changes to ISR 250, as described above. For example, if ISR 250 is an AST, the changes can include pruning a sub-tree, renaming a tree node, moving a sub-tree, and changing the attachment of an edge. In a respective case, update module 116 can update the references to code 202 and model 204 so that ISR 250 can continue to act as a bidirectional mapping between code 202 and model 204. As the changes in ISR 250 have resulted from changes in model 204, update module 116 may generate partial or complete code to correspond to the changes in model 204 based on the changes in ISR 250.

Based on the changes in ISR 250, update module 116 may not generate the complete code that reflects the changes in model 204 because the model is at a higher level of abstraction than code 202. However, update module 116 may generate partial code and annotations that may remind developer 106 to fill in the missing pieces of code. In either case, each component in ISR 250 can include references to the corresponding elements of code 202 and model 204 along with information about developer 106 who initiated the change. Similarly, system 110, in conjunction with the IDE, can create an annotation indicating that an update is needed in code 202 to satisfy the changes in model 204. System 110 can maintain annotations for both code 202 and model 204 (e.g., in an IDE), indicating the status of the updates. The annotation can remind developer 106 that further updates may be required to synchronize code 202 and model 204.

Augmentation and Collaboration

Figure 3:
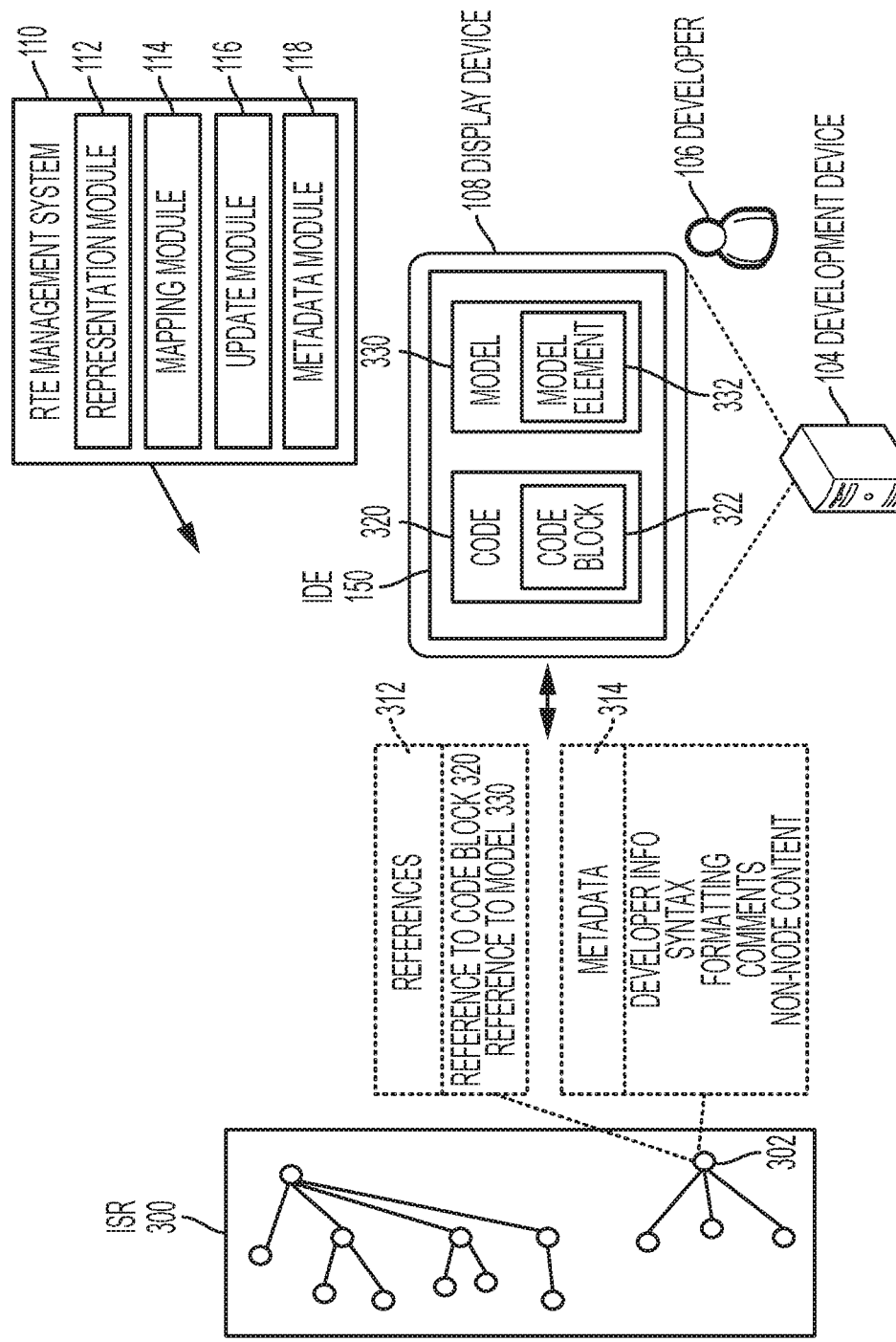
FIG. 3 illustrates an exemplary augmentation for an ISR, in accordance with an embodiment of the present application.

FIG. 3 illustrates an exemplary augmentation for an ISR, in accordance with an embodiment of the present application. An ISR 300 can represent code 320 and a corresponding model 330. ISR 300 can be enhanced with information augmentation. A component 302 in an ISR 300 can represent a code block 322 in code 320, and a corresponding model element 332 in model 330 developed using IDE 150 by developer 106. The augmentation of component 302 can help developer 106 understand code block 322 and model element 332. The augmentation can also help developer 106 to visualize the flow of control, as the control moves between the lines in code 320, and between corresponding elements in model 330, during the execution of code 320. If ISR 300 is represented as an AST, based on the augmentation, the AST can become an augmented AST (AAST).

Component 302 can be augmented with references 312, which can include references to a code block 322 and model element 332. References 312 can facilitate a bidirectional mapping between code block 322 and model element 332. Component 302 can be further augmented with metadata 314. By augmenting component 302 with references 312 and metadata 314, metadata module 118 can ensure efficient and interactive association between code block 322 and model element 332. Metadata 314 can include developer information indicating which developer(s) has contributed to each part of code block 322 and/or model element 332. Metadata 314 can also include formatting, syntax, comments, and non-code content associated with code block 322.

If references 312 and metadata 314 are sufficiently complete, IDE 150 can store code block 322 and model element 332 in a file that can represent ISR 300. If ISR 300 is represented as an AAST, IDE 150 can store code 320 and model 330 in a file representing an AAST (e.g., a file with the extension .aast). IDE 150 may not need to store the source and model files in which code 320 and model 330, respectively, are defined (e.g., .java, .cc, and .uml files). IDE 150 can then compute any needed source and model files in real time as needed from ISR 300. For example, when developer 106 wishes to view or modify code 320, IDE 150 can compute code 320 from ISR 300. Such an approach would ensure that the association between code 320, ISR 300, and model 330 remain updated and in synchronization.

Alternatively, IDE 150 may store code 320, model 330, and ISR 300 separately. IDE 150 can use respective derivation algorithms to derive each representation from the others if needed. System 110 can then include a technique to determine whether any file has been changed outside of a supported editor (e.g., IDE 150). Such changes can lead to an inconsistent state. ISR 300 can then include verification information that can ensure consistency among code 320, model 330, and ISR 300. The verification information can include, but are not limited to, a cryptographic hash of its constituent files (e.g., the source and model files), the timestamps of the file's last modified time, and version control commit references. The verification information may facilitate rapid change detection for code 320 and model 330.

Figure 4:
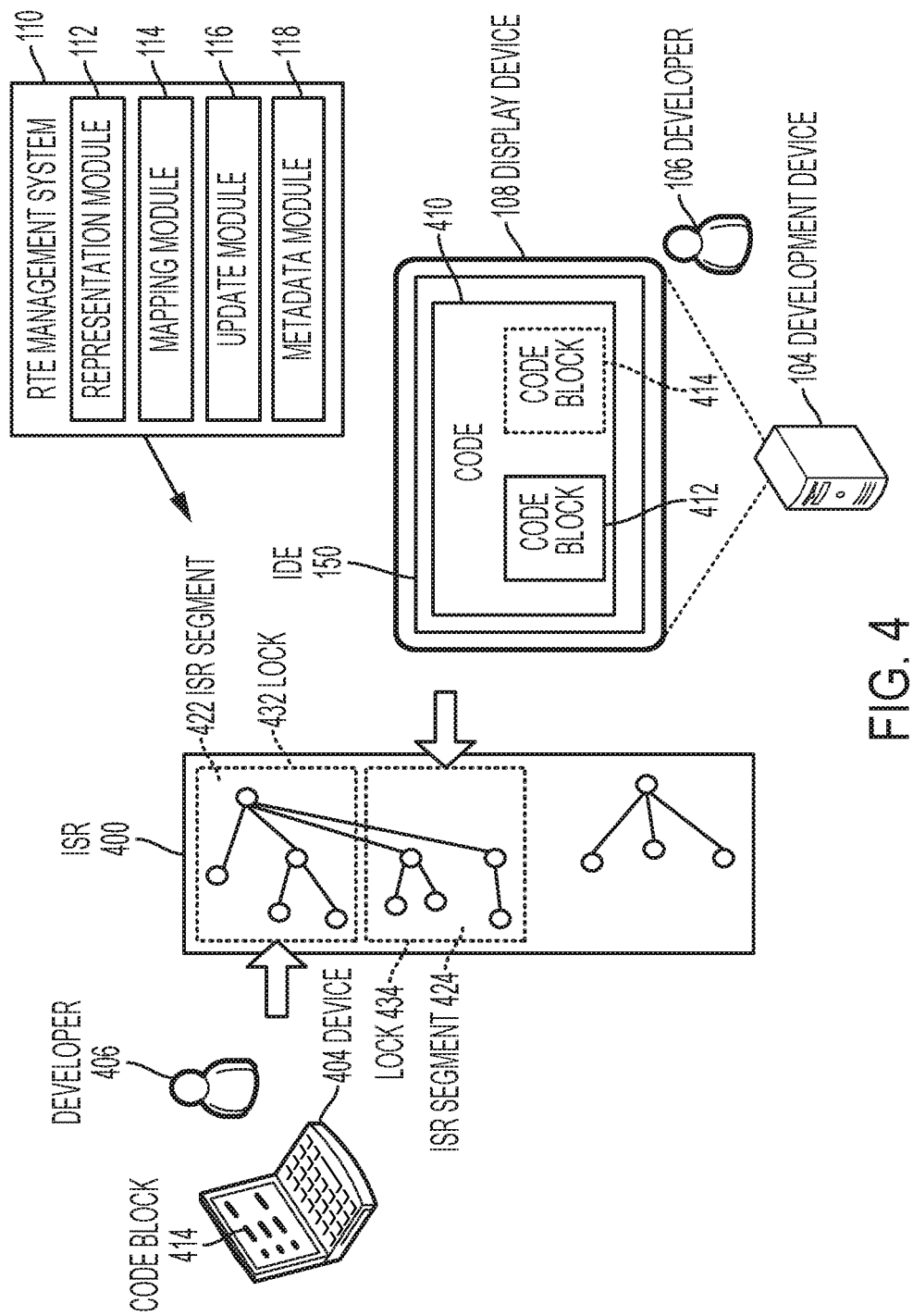
FIG. 4 illustrates an exemplary ISR facilitating efficient RTE in a collaborative software development environment, in accordance with an embodiment of the present application.

The developer information in metadata 314 can facilitate shared editing and viewing of code 320 and model 330 in a collaborative and distributed software development environment. FIG. 4 illustrates an exemplary ISR facilitating efficient RTE in a collaborative software development environment, in accordance with an embodiment of the present application. In this example, developer 106 may develop a code block 412 of code 410 on device 104 using IDE 150. On the other hand, developer 406 may develop a code block 414 of code 410 on device 404. IDE 150 may facilitate collaborative viewing that allows developer 106 to view code block 414, as it is being updated, in real time.

An ISR 400 can include an ISR segment 422 that represents code block 412 and an ISR segment 424 that represents code block 414. ISR segment 422 can include metadata that indicates that developer 106 has generated and/or updated code block 412. Similarly, ISR segment 422 can include metadata that indicates that developer 406 has generated and/or updated code block 414. The developer information can facilitate shared editing and viewing of code 410 in the collaborative environment. Since the updates are shared among developers 106 and 406, the respective views can be updated as well.

Hence, system 110 can facilitate distributed locking. System 110 can apply a lock 432 on behalf of developer 106 on ISR segment 422 and a lock 434 on behalf of developer 406 on ISR segment 424. The distributed locking can ensure consistency and versioning of updates. Since developers 106 and 406 may work, often in parallel, on code 410, system 110 can identify and track developers 106 and 406 editing code blocks 412 and 414, respectively. In this way, system 110 can ensure the consistency of the collaborative development process. Here, the phrase "lock" has been used in a generic sense and can any indicate mechanism that may isolate and/or reconcile the changes in ISR 400. For example, instead of preventing changes on ISR 400, as facilitated by a traditional lock, system 110 may automatically merge the changes on ISR 400 and/or facilitate version control for ISR 400. System 110 may present the changes in different versions in a textual or a visual format, and show how ISR 400 may appear upon merging.

Operations

Figure 5A:
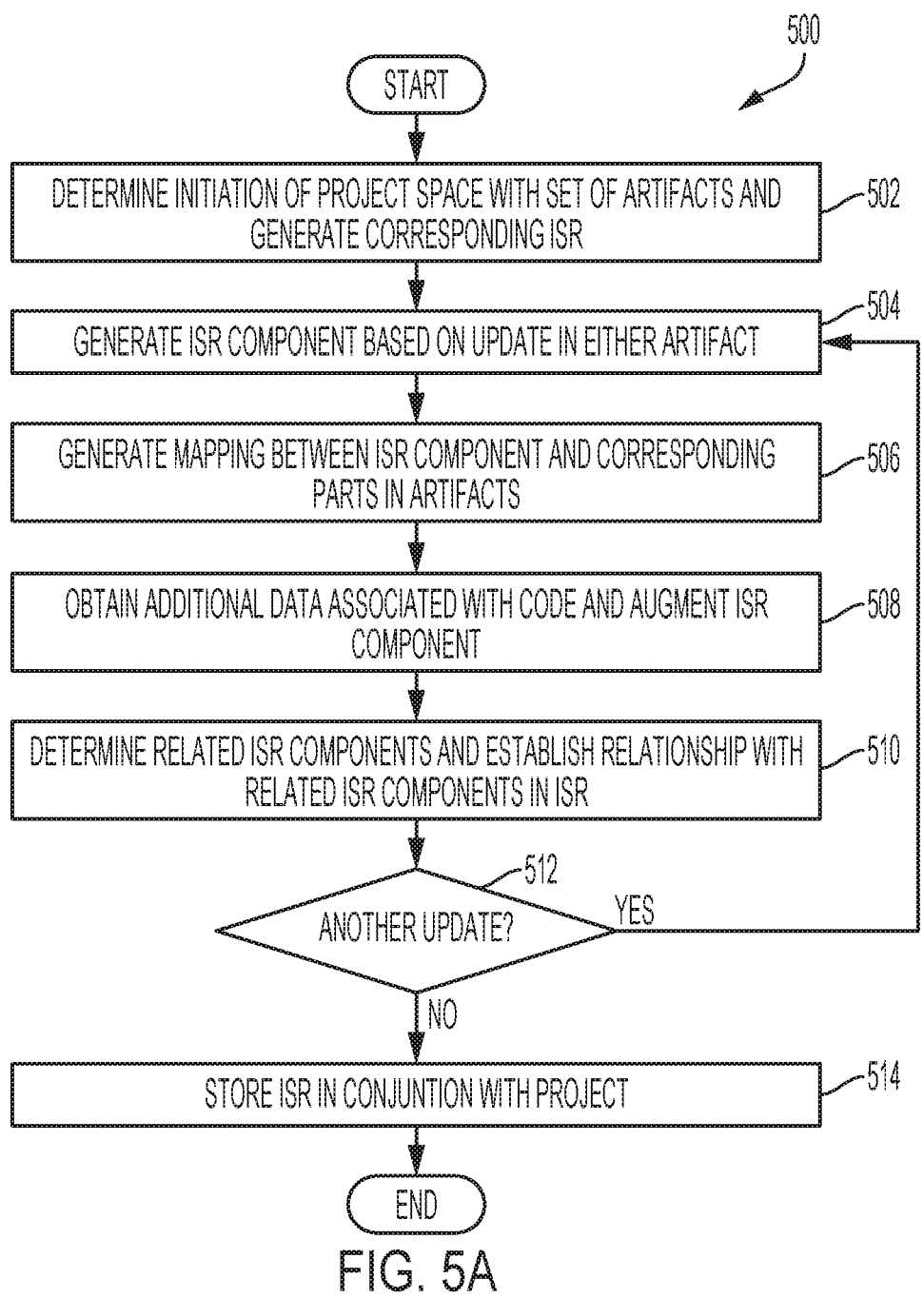
FIG. 5A presents a flowchart illustrating a method of an RTE management system generating an ISR to establish an association between software artifacts, in accordance with an embodiment of the present application.

FIG. 5A presents a flowchart illustrating a method of an RTE management system generating an ISR to establish an association between software artifacts, in accordance with an embodiment of the present application. During operation, the system can determine the initiation of a project space with a set of artifacts (e.g., code and model) and generate a corresponding ISR (operation 502). The ISR can be an empty ISR (e.g., an AST without any node).

The system can then generate an ISR component based on an update in either artifact (operation 504). The system can then generate a mapping between an ISR component and the corresponding parts in the artifacts (operation 506). For example, the developer can generate a new method in the code or a new method signature in the model in the project space.

The system can generate an ISR component (e.g., an AST node) and include references to the corresponding parts in the code and the model, thereby generating a bidirectional mapping. The system may obtain additional data associated with the code, such as the developer information, formatting, syntax, comments, and non-code content, and augment the ISR component (operation 508). The system may extract one or more pieces of additional data from the code. The system can then determine the related ISR components and establish a relationship with the related ISR components in the ISR (operation 510).

For example, if the ISR component represents a code line in a method, a related ISR component can be the ISR component representing the method. The relationship can then be a parent-child or an "is a part of" relationship. Subsequently, the system can check for another update (operation 512). If the system detects another update in the project space, the system can continue to generate an ISR component based on the update (operation 504). On the other hand, if the system does not detect any other update, the system can store the ISR in conjunction with the project, thereby providing persistence to the ISR (operation 514).

Figure 5B:
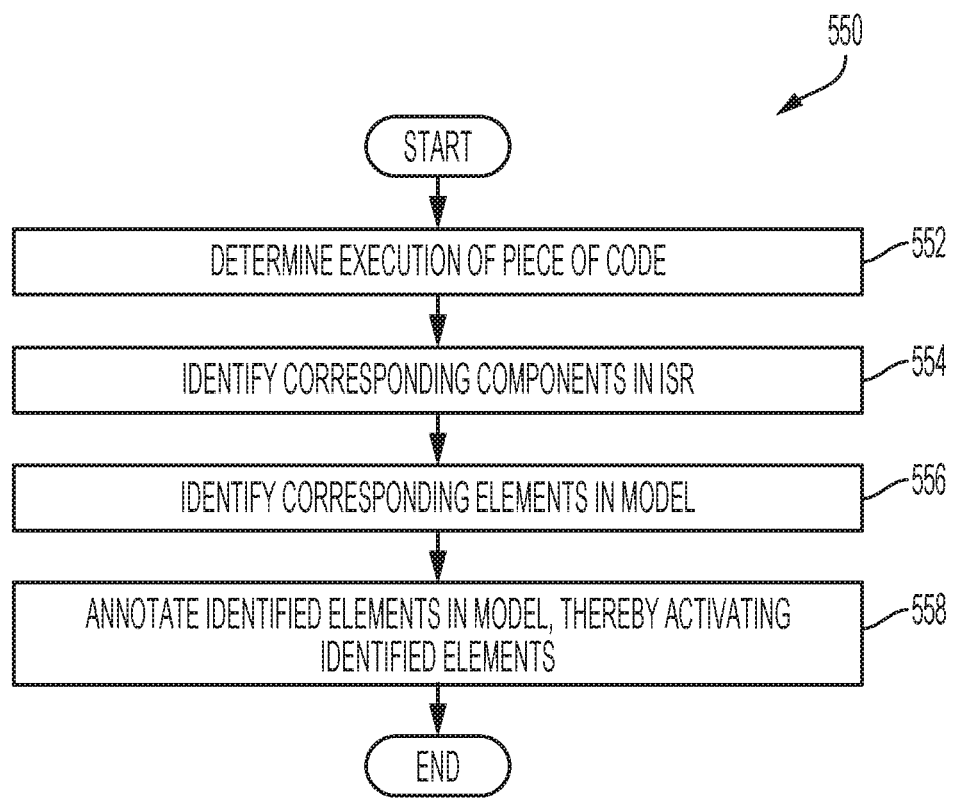
FIG. 5B presents a flowchart illustrating a method of an RTE management system identifying an element in a development model associated with the execution of a code block, in accordance with an embodiment of the present application.

FIG. 5B presents a flowchart illustrating a method of an RTE management system identifying an element in a development model associated with the execution of a code block, in accordance with an embodiment of the present application. During operation, the system can determine the execution of a piece of code (e.g., one or more code blocks) (operation 552) and identify corresponding components in the ISR (operation 554). The system can then identify the corresponding elements in the model (operation 556). Subsequently, the system can annotate the identified elements in the model, thereby activating the identified elements (operation 558). In addition to annotating and activating model elements, the system can highlight them visually. Therefore, the developer may easily see which elements of the model are associated with the lines of code that are being executed.

Figure 6A:
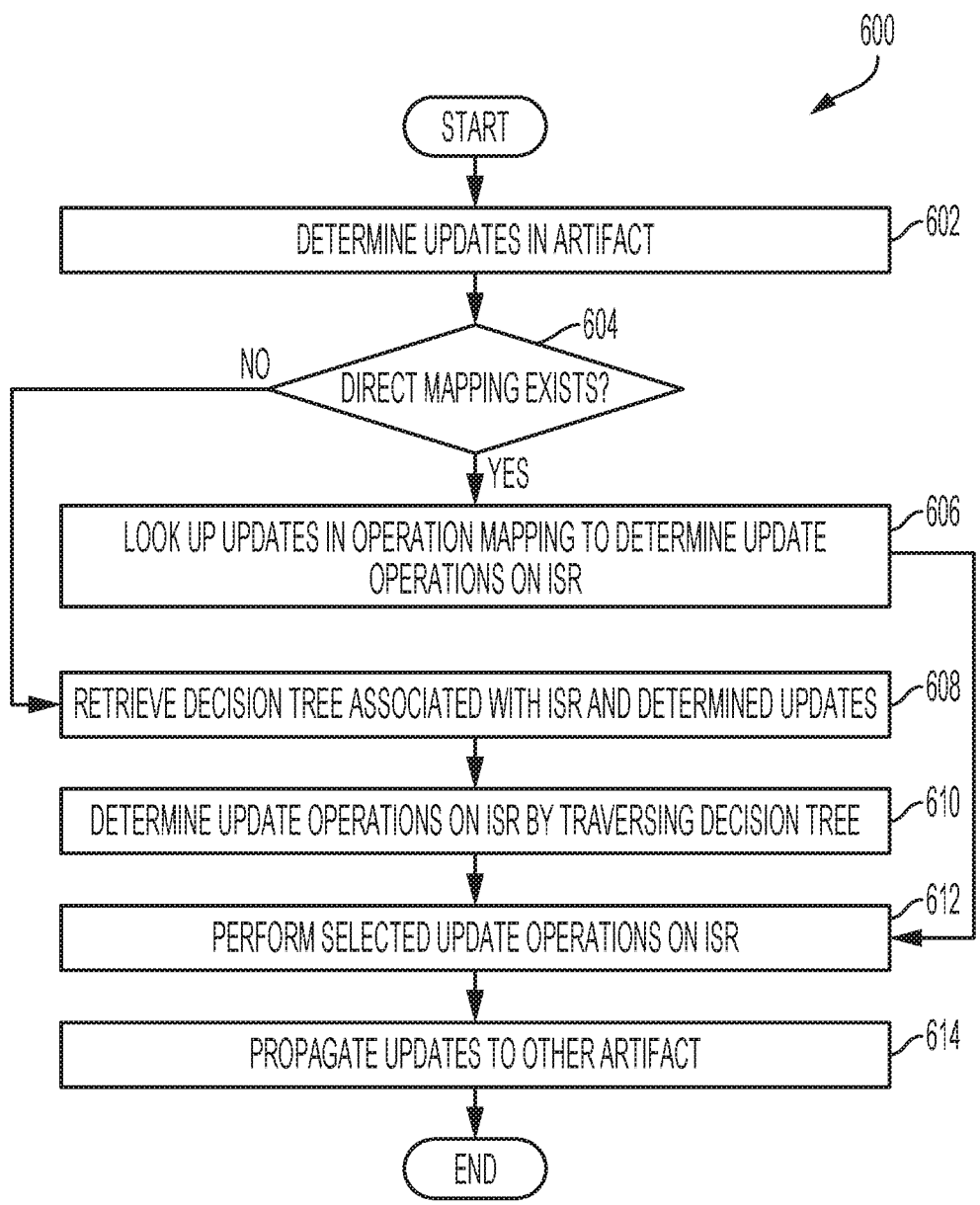
FIG. 6A presents a flowchart illustrating a method of an RTE management system updating an ISR based on updates in a software artifact, in accordance with an embodiment of the present application.

FIG. 6A presents a flowchart illustrating a method of an RTE management system updating an ISR based on updates in a software artifact, in accordance with an embodiment of the present application. The system can determine updates in an artifact (e.g., a piece of code or a model) (operation 602) and determine whether a direct mapping exists for the update (operation 604). If a direct mapping exists, the system can look up the updates in an operation mapping to determine the update operations on the ISR (operation 606).

On the other hand, if a direct mapping doesn't exist, the system can retrieve a decision tree associated with the ISR and the determined updates (operation 608). The system can then determine the update operations on the ISR by traversing the decision tree (operation 610). Upon determining the update operations on the ISR (operation 606 or 610), the system can perform the update operations on the ISR (operation 612) and propagate the updates to the other artifact (operation 614).

Figure 6B:
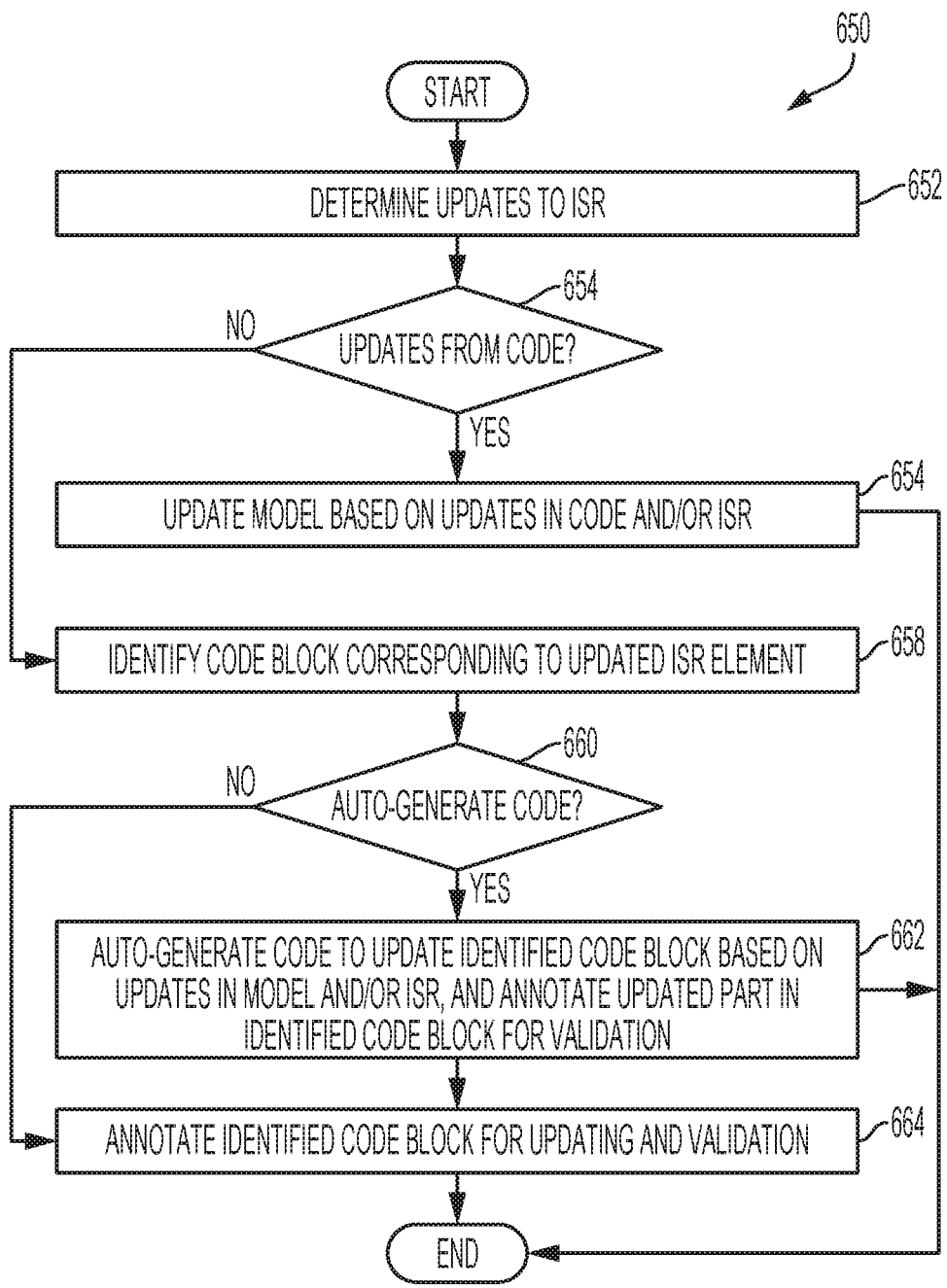
FIG. 6B presents a flowchart illustrating a method of an RTE management system updating a software artifact based on updates in an ISR, in accordance with an embodiment of the present application.

FIG. 6B presents a flowchart illustrating a method of an RTE management system updating a software artifact based on updates in an ISR, in accordance with an embodiment of the present application. During operation, the system can determine the updates in the ISR (operation 652) and determine whether the updates originate from the code (operation 654). If the updates have originated from the code, the system can update the model based on the updates in the code and/or ISR (operation 656). Updating the model may include, but are not limited to, changing a method signature in the model to correspond to a new method signature in the code; adding or removing an edge in the model to indicate addition or removal of a connection in the code (e.g., between classes, modules, or objects), respectively; and adding additional variables, classes, modules, and other elements to the model to correspond to the addition of such elements in the code.

On the other hand, if the updates did not originate from the code, the system can identify the code block corresponding to the updated ISR element (operation 658). The system can then determine whether the system can auto-generate the corresponding code (operation 660). If the system is capable of auto-generating the code, the system may auto-generate the code to update the identified code block based on the updates in the model and/or the ISR, and can annotate the updated part in the identified code block for validation (operation 662). On the other hand, if the system cannot auto-generate the code, the system can annotate the identified code block for updating and validation (operation 664).

Exemplary Computer System and Apparatus

Figure 7:
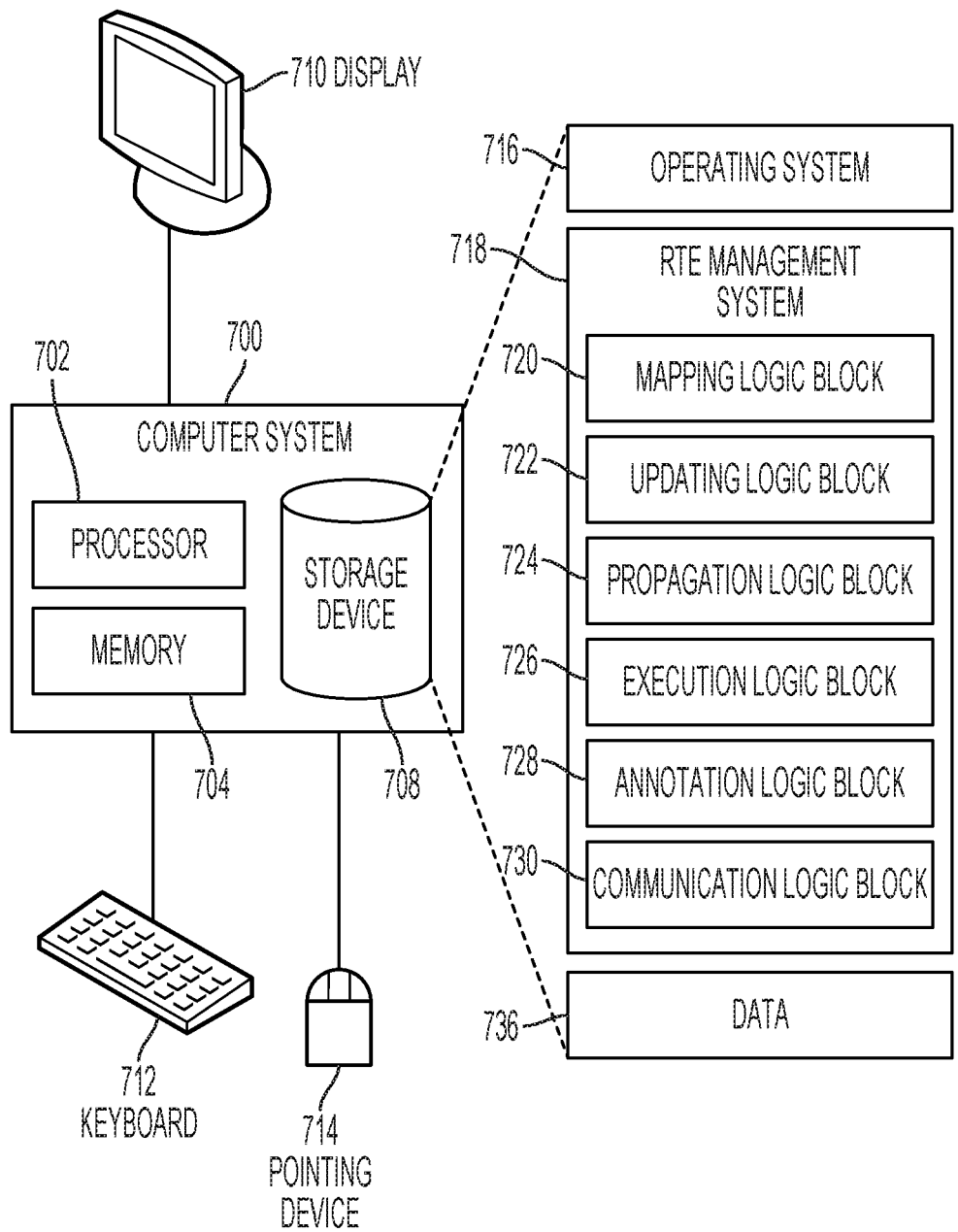
FIG. 7 illustrates an exemplary computer system facilitating an RTE management system that supports efficient RTE based on an ISR, in accordance with an embodiment of the present application.

FIG. 7 illustrates an exemplary computer system facilitating an RTE management system that supports efficient RTE based on an ISR, in accordance with an embodiment of the present application. Computer system 700 includes a processor 702, a memory device 704, and a storage device 708. Memory device 704 can include a volatile memory device (e.g., a dual in-line memory module (DIMM)). Furthermore, computer system 700 can be coupled to a display device 710, a keyboard 712, and a pointing device 714. Storage device 708 can store an operating system 716, an RTE management system 718, and data 736. RTE management system 718 can incorporate the operations of system 110.

RTE management system 718 can include instructions, which when executed by computer system 700 can cause computer system 700 to perform methods and/or processes described in this disclosure. Specifically, RTE management system 718 can include instructions for generating a persistent ISR representing software artifacts (mapping logic block 720). RTE management system 718 can also include instructions for maintaining a bidirectional mapping between the artifacts via a corresponding component in the ISR (mapping logic block 720). Furthermore, RTE management system 718 includes instructions for determining an update in an artifact and updating the ISR accordingly (updating logic block 724).

RTE management system 718 can also include instructions for propagating the updates from one artifact to another based on the ISR (propagation logic block 724). RTE management system 718 can further include instructions for identifying and activating corresponding model elements when a piece of code is executed (execution logic block 726). Moreover, RTE management system 718 can include instructions for annotating the updated portions of one or more artifacts (annotation logic block 728). RTE management system 718 can also include instructions for annotating activated model elements when a piece of code is executed (annotation logic block 728). RTE management system 718 may further include instructions for sending and receiving messages (e.g., packets and frames) (communication logic block 730).

Data 736 can include any data that can facilitate the operations of system 110. Data 736 may include one or more of: a data structure representing an ISR, references and metadata in a respective component in an ISR, and the artifacts.

Figure 8:
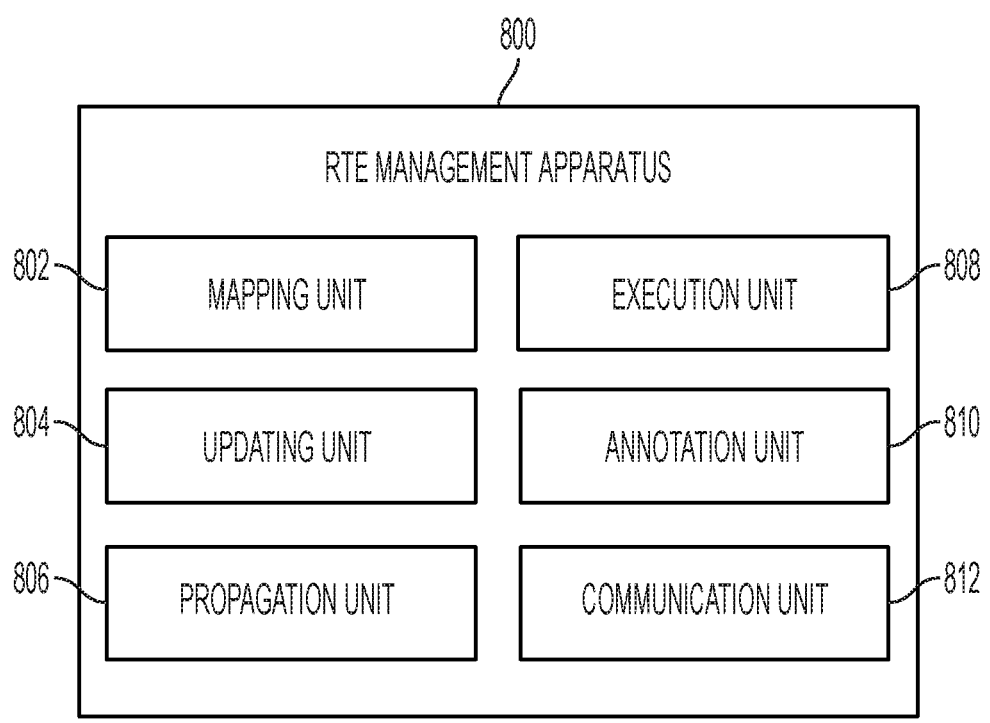
FIG. 8 illustrates an exemplary apparatus that facilitates efficient RTE based on an ISR, in accordance with an embodiment of the present application.

FIG. 8 illustrates an exemplary apparatus that facilitates efficient RTE based on an ISR, in accordance with an embodiment of the present application. RTE management apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device that is capable of communicating with other computer systems and/or devices. Specifically, apparatus 800 can comprise units 802-812, which perform functions or operations similar to modules 720-730 of computer system 700 of FIG. 7, including: a mapping unit 802; an updating unit 804; a propagation unit 806; an execution unit 808; an annotation unit 810; and a communication unit 812.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A method for facilitating round-trip engineering in a development environment, comprising:
    maintaining an intermediate system representation (ISR) for a set of artifacts associated with a piece of software, wherein the set of artifacts includes a piece of code and a development model, and wherein the ISR remains persistent without requiring the ISR to be regenerated each time a synchronization is triggered between the piece of code and the development model;
    incorporating, in a respective component of the ISR, a reference to a code block in the piece of code and a corresponding model element in the development model, wherein the respective component represents the code block and the model element in the ISR;
    in response to determining a first update in a first segment of a first artifact of the set of artifacts, identifying, in the ISR, a first component corresponding to the first segment;
    identifying a second segment in a second artifact from the set of artifacts based on a mapping between the first segment and the second segment, wherein the mapping is maintained in the first component of the ISR, wherein the first component further comprises metadata indicating respective developer information of the first and second segments;
    propagating a second update to the second segment to reflect the first update in the first segment; and
    maintaining the first component in the ISR upon the propagating of the second update and while the first segment and the second segment exist.

2. The method of claim 1, further comprising determining a set of operations on the ISR based on the first update in the first segment.

3. The method of claim 2, wherein determining the set of operations on the ISR comprises one or more of:
    looking up the first update in a direct mapping between the first update and the set of operations; and
    traversing a decision tree associated with the ISR and the first update.

4. The method of claim 2, wherein the propagating of the second update comprises determining operations of the second update based on one or more of:
    the first update in the first segment; and
    the set of operations on the ISR.

5. The method of claim 1, wherein the metadata of the first component further comprises one or more of: formatting, syntax, comments, and non-code content.

6. The method of claim 1, wherein the ISR is represented as an augmented abstract syntax tree (AAST), wherein the respective component of the ISR is a tree node of the AAST that has been augmented with corresponding metadata.

7. The method of claim 1, further comprising:
    determining a plurality of developers contributing to different segments of an artifact based on the developer information of the metadata; and
    locking a particular component of the ISR associated with an individual segment of the artifact on behalf of a corresponding developer.

8. The method of claim 1, further comprising:
    determining changes to a second component of the ISR based on changes from a plurality of developers to the first artifact;
    merging the changes to the second component to generate a third component of the ISR that replaces the second component and is consistent with the changes; and
    updating the second artifact to be consistent with the third component.

9. The method of claim 1, further comprising:
    determining whether the second update can be generated automatically;
    in response to determining that the second update can be generated automatically, generating operations of the second update and applying the generated operations on the second segment; and
    in response to determining that the second update can cannot be automatically generated, annotating the second segment for updating.

10. The method of claim 1, further comprising:
    determining execution of a first code block in the piece of code; and
    annotating a first model element in the development model, wherein the first code block and the first model element are associated with a same component in the ISR.

11. The method of claim 1, further comprising:
    storing a file representing the ISR in a local persistent storage device without storing files representing the set of artifacts; and
    in response to a request for accessing a particular artifact, generating a second file representing the particular artifact from the ISR.

12. A non-transitory computer-readable storage medium storing instructions that when executed by a computer cause the computer to perform a method for facilitating round-trip engineering in a development environment, the method comprising:
    maintaining an intermediate system representation (ISR) for a set of artifacts associated with a piece of software, wherein the set of artifacts includes a piece of code and a development model, and wherein the ISR remains persistent without requiring the ISR to be regenerated each time a synchronization is triggered between the piece of code and the development model;
    incorporating, in a respective component of the ISR, a reference to a code block in the piece of code and a corresponding model element in the development model, wherein the respective component represents the code block and the model element in the ISR;

in response to determining a first update in a first segment of a first artifact of the set of artifacts, identifying, in the ISR, a first component corresponding to the first segment;

identifying a second segment in a second artifact from the set of artifacts based on a mapping between the first segment and the second segment, wherein the mapping is maintained in the first component of the ISR, wherein the first component further comprises metadata indicating respective developer information of the first and second segments;

propagating a second update to the second segment to reflect the first update in the first segment; and maintaining the first component in the ISR upon the propagating of the second update and while the first segment and the second segment exist.

13. The computer-readable storage medium of claim 12, wherein the method further comprises determining a set of operations on the ISR based on the first update in the first segment.

14. The computer-readable storage medium of claim 13, wherein determining the set of operations on the ISR comprises one or more of:

looking up the first update in a direct mapping between the first update and the set of operations; and traversing a decision tree associated with the ISR and the first update.

15. The computer-readable storage medium of claim 13, wherein the propagating of the second update comprises determining operations of the second update based on one or more of:

the first update in the first segment; and the set of operations on the ISR.

16. The computer-readable storage medium of claim 12, wherein the metadata of the first component further comprises one or more of: formatting, syntax, comments, and non-code content.

17. The computer-readable storage medium of claim 12, wherein the ISR is represented as an augmented abstract syntax tree (AAST), wherein the respective component of the ISR is a tree node of the AAST that has been augmented with corresponding metadata.

18. The computer-readable storage medium of claim 12, wherein the method further comprises:

determining a plurality of developers contributing to different segments of an artifact based on the developer information of the metadata; and locking a particular component of the ISR associated with an individual segment of the artifact on behalf of a corresponding developer.

19. The computer-readable storage medium of claim 12, wherein the method further comprises:

determining changes to a second component of the ISR based on changes from a plurality of developers to the first artifact;

merging the changes to the second component to generate a third component of the ISR that replaces the second component and is consistent with the changes; and updating the second artifact to be consistent with the third component.

20. The computer-readable storage medium of claim 12, wherein the method further comprises:

determining whether the second update can be generated automatically;

in response to determining that the second update can be generated automatically, generating operations of the second update and applying the generated operations on the second segment; and in response to determining that the second update can cannot be generated automatically, annotating the second segment for updating.

21. The computer-readable storage medium of claim 12, wherein the method further comprises:

determining execution of a first code block in the piece of code; and annotating a first model element in the development model, wherein the first code block and the first model element are associated with a same component in the ISR.

22. The computer-readable storage medium of claim 12, wherein the method further comprises:

storing a file representing the ISR in a local persistent storage device without storing files representing the set of artifacts; and in response to a request for accessing particular artifact, generating a second file representing the particular artifact from the ISR.

* * * * *